F. R. ALLEN.
CLUTCH.
APPLICATION FILED APR. 28, 1911.

1,025,043.

Patented Apr. 30, 1912.

Witnesses
Chas. W. Eddy.
E. J. Ogden

Inventor
Fred R. Allen
By Howard E. Barlow
Attorney

UNITED STATES PATENT OFFICE.

FRED R. ALLEN, OF PROVIDENCE, RHODE ISLAND, ASSIGNOR TO EUGENE F. BOWEN, OF PROVIDENCE, RHODE ISLAND.

CLUTCH.

1,025,043.  Specification of Letters Patent.  Patented Apr. 30, 1912.

Application filed April 28, 1911. Serial No. 623,925.

*To all whom it may concern:*

Be it known that I, FRED R. ALLEN, a citizen of the United States, and resident of Providence, in the county of Providence and State of Rhode Island, have invented certain new and useful Improvements in Clutches, of which the following is a specification.

This invention has reference to clutches, its object being to provide a clutch of simple and inexpensive construction that is absolutely positive in its action even while operating at high speed, said clutch being adapted to readily connect and disconnect different movable parts.

With these and other objects in view, the invention consists of certain novel features of construction, as will be more fully described and particularly pointed out in the appended claims.

Figure 1:
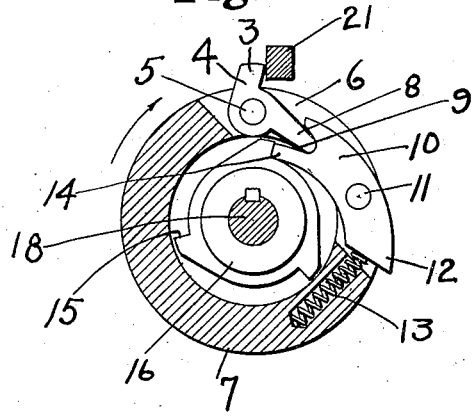
Figure 2:
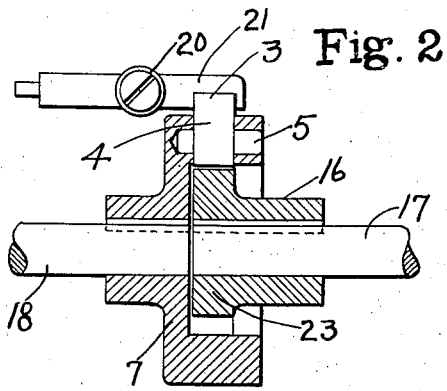
Figure 3:
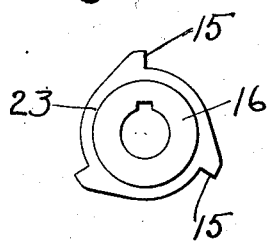
Figure 4:
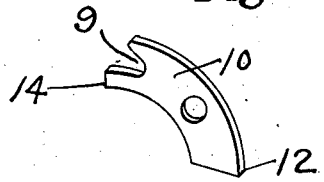

In the accompanying drawings: Figure 1— is a front elevation of my improved clutch partly in section. Fig. 2— is a side elevation of my clutch partly in section. Fig. 3— is a front view of the toothed clutch member. Fig. 4— shows a side view of the pawl in detail.

Referring to the drawings a dog 4 is pivotally connected at 5 in a recess or slot 6 formed in the periphery of the cup-shaped clutch member 7. This dog has an outwardly extending finger 3 and a laterally extending toe 8, said toe entering a notch 9 in the end of a pawl 10. This pawl is also pivotally connected at 11 in an extension of said slot 6 to the clutch member 7 and has its heel 12 pressed outwardly by a spring 13. The tip 14 of this pawl 10 is adapted to coact with either one of a plurality of teeth 15 of the toothed clutch member 23, the hub 16 of which is secured to a shaft 17 that is in alinement with the shaft 18 on which the clutch member 7 is secured. In this particular case it is assumed that the shaft 17 is the driver and is running constantly and transmits its motion when desired through the clutch members to shaft 18.

In practice any suitable mechanism may be employed for engaging the dog 4 and causing the pawl 10 to release the toothed member 23, but for convenience I have shown an arm or tripper 21 pivotally held at 20, the same being adapted to serve as a stop or barrier to be moved manually or otherwise into the path of the dog finger 3 during a revolution of the clutch, whereby the pawl 10 is withdrawn from engagement with the tooth 15 in the toothed member 23 immediately releasing the driven member 7 thereby permitting the driven shaft 18 to stop while the driver 17 continues to rotate until such time as the stop arm or tripper is removed to permit the pawl to again engage the toothed member when the whole will resume its rotation in unison. In other words, the pawl 10 serves to normally connect together both the driven and driving members of the clutch so that they will rotate in unison which condition continues to exist until the tripper arm 21 is moved into the path of rotation of the extending finger 3 of the dog 4, thereby causing the dog to raise the pawl to release the driven from the driving member and permit the former to at once stop while the latter member continues to revolve.

The device is extremely simple and inexpensive in construction and absolutely positive in its action, and these clutch members may be operatively connected and disconnected during any predetermined portion of a single revolution, or at intervals of any number of revolutions of the members as may be desired.

I claim:

1. The combination with two shafts in alinement, of a clutch member carried by each, one of said members having a peripheral tooth, the other of said members carrying a spring pressed pawl adapted to engage said tooth and also carrying a dog for controlling the position of said pawl, and a movable tripper adapted to engage said dog disengage said pawl and stop the dog carrying member.

2. The combination with two shafts in alinement of a socket clutch member carried by one shaft, a toothed clutch member carried by the other shaft and extending into the socket of the first named member, a spring actuated pawl carried by the socket member for engaging the toothed member, a dog also carried by said socket member for controlling the position of said pawl, and a movable tripper adapted to engage said dog disengage said pawl and stop the socket member.

3. The combination with two shafts in alinement, a clutch member provided with a socket carried by one shaft, a toothed clutch member carried by the other shaft and extending into the socket of the first named member, a pawl, and a dog both operatively mounted and substantially inclosed in the rim of said socket member, said pawl adapted to engage the toothed member and said dog adapted to control the position of said pawl, the latter also having a member projecting beyond the face of its supporting member, and a movable tripper adapted to extend into the path of said projection to move said dog to disengage the pawl and stop the socket member.

In testimony whereof I affix my signature in presence of two witnesses.

FRED R. ALLEN.

Witnesses:
 HOWARD E. BARLOW,
 E. I. OGDEN.